United States Patent [19]

Larson

[11] 4,145,927

[45] Mar. 27, 1979

[54] APPARATUS FOR DETERMINING THE LIQUID LEVEL IN A TANK

[76] Inventor: Roger G. Larson, 911 Laguna Rd., Fullerton, Calif. 92635

[21] Appl. No.: 850,461

[22] Filed: Nov. 10, 1977

[51] Int. Cl.² .......................................... G01F 23/26
[52] U.S. Cl. ................................................. 73/304 C
[58] Field of Search ..................... 73/304 C; 361/284

[56] References Cited

U.S. PATENT DOCUMENTS

| | | | |
|---|---|---|---|
| 2,787,783 | 4/1957 | Storm | 340/244 |
| 3,199,350 | 8/1965 | Schubring | 73/304 |
| 3,377,861 | 4/1968 | Thaler et al. | 73/304 |
| 3,515,000 | 6/1970 | Baumoel | 73/304 C |
| 3,534,606 | 10/1970 | Stamler et al. | 73/304 C |
| 3,777,257 | 12/1973 | Geisselmann | 324/61 R |
| 3,811,051 | 5/1974 | Merell | 307/118 |
| 3,862,571 | 1/1975 | Vogel | 73/304 |
| 3,939,360 | 2/1976 | Jackson | 307/118 |
| 4,010,650 | 3/1977 | Platkowski | 73/304 C |

*Primary Examiner*—S. Clement Swisher
*Attorney, Agent, or Firm*—Philip M. Hinderstein

[57] ABSTRACT

Apparatus for determining the liquid level in tanks, such as are used in recreational vehicles, which utilizes a pair of parallel plates secured to the outside of the tank to avoid contact with the liquid inside of the tank. The change in capacitance between the plates as a function of liquid level is utilized to generate an electrical signal indicative of liquid level. With the present invention, more than one tank can be connected to the same measuring electronics and the measuring electronics may be mounted at a central point, adjacent the liquid level visual indicator. The present apparatus is relatively independent of variations in conductivity of the liquid in the tank and relatively independent of operating frequency. The apparatus is relatively unaffected by the capacitance of long cables between the plates and the measuring electronics.

7 Claims, 6 Drawing Figures

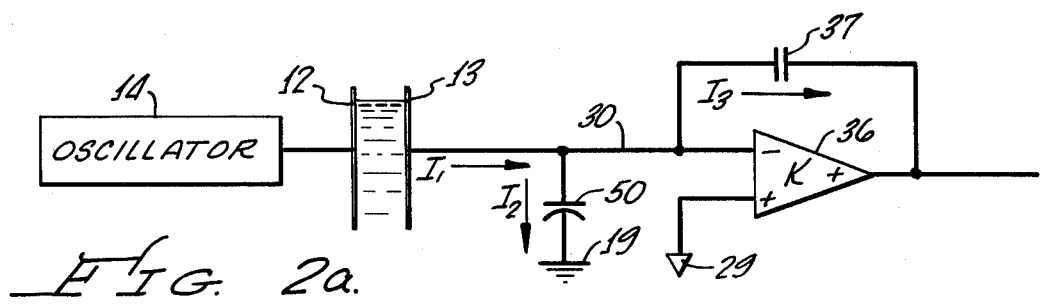
FIG. 2a.
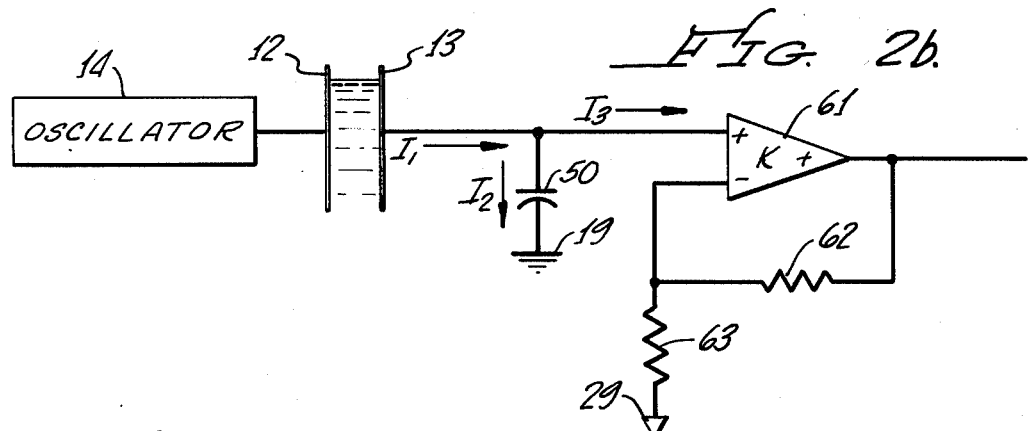
FIG. 2b.
FIG. 3.
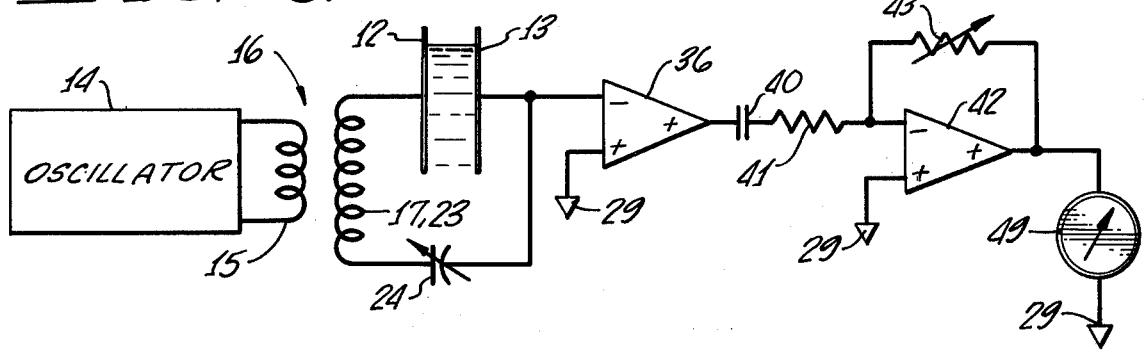
FIG. 4.
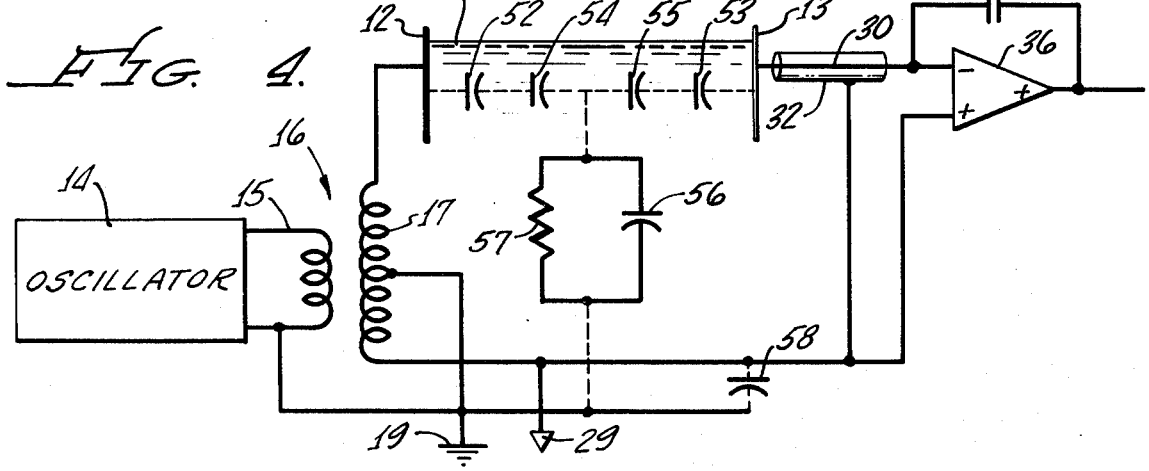

APPARATUS FOR DETERMINING THE LIQUID LEVEL IN A TANK

BACKGROUND OF THE INVENTION

1. Field of the Invention

The present invention relates to apparatus for determining the liquid level in a tank and, more particularly, to externally mounted means for determining and providing a remote indication of the liquid level in a tank, such as a waste water tank for a recreational vehicle.

2. Description of the Prior Art

A wide variety of different types of liquid containing tanks are provided with measurement means for determining the liquid level therein. Usually, such measurement means are positioned within the tank and directly contact the surface of the liquid in order to determine the level thereof. On the other hand, in certain cases, such as in the measurement of the liquid level in waste water holding tanks used in recreational vehicles and the like, it is desirable that the measurement means not require an object to contact the liquid inside the tank or require holes to be drilled in the tank. Any obstruction or metallic object inside of a waste water tank will be subject to strong corrosive action and will become entangled with solid or semi-solid materials, causing a malfunction of the measuring device and/or preventing the tank from being completely emptied. This also leads to sanitary problems and unpleasant odors in the case of waste water holding tanks.

In order to determine the liquid level in a tank without contacting the liquid therein, it has been proposed to mount metal electrodes, probes, or plates on the tank, which plates are insulated from the liquid therein in a manner such that the capacitance between the plates varies as a function of the level of the liquid in the tank. This change in capacitance can then be utilized to provide an indication of liquid level. However, several problems have been encountered with this type of system which has rendered it impractical for use heretofore.

For example, it is desirable to locate the electronic circuit components at a central location, preferably where the liquid level indicating means is located. This permits the electronic circuit components to be used for measuring more than one tank such as the holding tank and the water tank for a recreational vehicle. This is also desirable so that the electronic components are in a more benign environment and to eliminate the cost of special containers to protect the electronics when mounted externally. However, when this is done, a cable is required for connecting the plates to the electronics. The problem is that the capacitance of the cable tends to be significantly more than the capacitance between the plates, making accurate measurements extremely difficult since the major portion of the current is dissipated by the cable capacitance. As a result, it has been necessary heretofore to mount the electronics adjacent the tank with the attendant disadvantages discussed previously.

In a practical system, the measuring circuitry should be relatively independent of variations in conductivity of the liquid in the tanks since some liquids, such as waste water, will be highly conductive while drinking water may be quite pure and have a very low conductivity. Most circuits designed heretofore have not had this relative independence.

The measurement circuitry should also be relatively independent of operating frequency so that frequency stability of the oscillator used to drive the plates is not a factor in the accuracy of the measurement. Again, in circuits designed heretofore, the circuit has not had this relative independence.

SUMMARY OF THE INVENTION

According to the present invention, there is provided measurement means for determining the liquid level in tanks which solves these problems in a manner unknown heretofore. With the present measuring means, no element need be introduced inside of the tank, making the present measuring means ideally suited for waste water tanks, such as used in recreational vehicles. With the present apparatus, the measuring electronics may be mounted at a central point so that it can be connected to more than one tank. This can be achieved because in one of its embodiments, the present apparatus effectively reduces to a negligible value the capacitance of a very long cable used to connect the tank sensors to the measurement electronics, while in its other embodiment, the present apparatus uses this cable capacitance as part of the circuit, making the use of moderately long cables practical.

The present circuit means is relatively independent of variations in conductivity of the liquid in the tank and is relatively independent of operating frequency. The present apparatus is capable of operating over a wide range of frequencies and driving waveforms, making the oscillator circuit design uncritical and allowing operation at frequencies to avoid RFI problems. The present apparatus can operate on either internally or externally mounted sensors and tanks using either kind of sensor can be intermixed in a single measuring system.

Briefly, and in accordance with the first embodiment of the present invention, the present apparatus for determining the liquid level in a tank comprises a pair of parallel plates secured to the tank in a manner such that the capacitance between the plates increases as the liquid level in the tank increases, an oscillator for producing an AC voltage, the AC voltage being coupled to one of the plates, an operational amplifier having an input and an output of opposite polarity to the input, a shielded cable connected between the other of the plates and the input of the operational amplifier, a feedback capacitor connected between the output of the operational amplifier and the input, the output of the operational amplifier being substantially independent of the capacitance of the cable, and a meter operatively coupled to the output of the operational amplifier for providing an indication of the liquid level in the tank.

In accordance with the second embodiment of the present invention, the present apparatus comprises a pair of parallel plates secured to the tank in a manner such that the capacitance between the plates increases as the liquid level in the tank increases, an oscillator for producing an AC voltage, the AC voltage being coupled to one of the plates, an amplifier having a high input impedance, a shielded cable connected between the other of the plates and the input of the amplifier, and a meter operatively coupled to the output of the amplifier for providing an indication of the liquid level in the tank.

It is therefore an object of the present invention to provide apparatus for determining the liquid level in a non-metallic tank.

It is a further object of the present invention to provide apparatus for determining the liquid level in a tank which does not require elements to be introduced inside of the tank.

It is a still further object of the present invention to provide apparatus for determining the liquid level in a tank which permits more than one tank to be connected to the same measurement circuitry.

It is another object of the present invention to provide apparatus for determining the liquid level in a tank wherein the measurement apparatus can be positioned at a location remote from the tank.

It is still another object of the present invention to provide apparatus for determining the liquid level in a tank including an oscillator wherein the apparatus is relatively independent of the operating frequency of the oscillator.

Another object of the present invention is the provision of apparatus for determining the liquid level in a tank which is relatively independent of variations in conductivity of the liquid in the tank.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like or corresponding parts in the several figures and wherein:

BRIEF DESCRIPTION OF THE DRAWINGS

FIGS. 2a, 3, and 4 are simplified block diagrams of portions of the apparatus of FIG. 1a, which diagrams are useful in explaining the operation of the apparatus of FIG. 1a; and FIG. 2b is a simplified block diagram of the apparatus of FIG. 1b, which diagram is useful in explaining the operation of the apparatus of FIG. 1b.

DESCRIPTION OF THE PREFERRED EMBODIMENTS

Figure 1A:
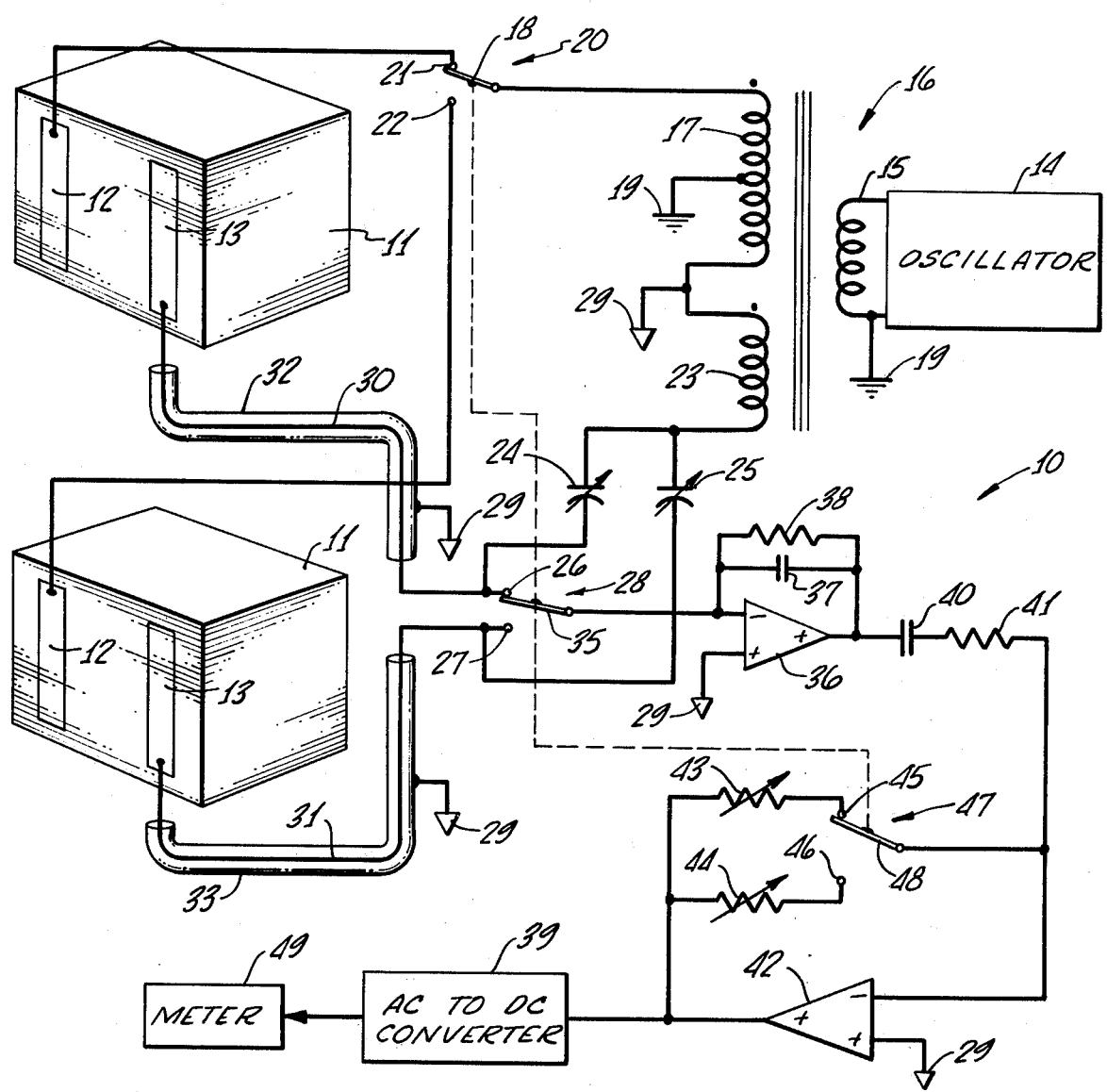
FIG. 1a is a block diagram of a first embodiment of the present apparatus for determining the liquid level in a non-metallic tank.

Referring now to the drawings and, more particularly, to FIG. 1a thereof, there is shown circuit means, generally designated 10, for determining the liquid level in one or more of a plurality of tanks 11. According to the present invention, each tank 11 has a pair of parallel, spaced, metallic plates 12 and 13 secured to one wall thereof, in a vertical orientation, so that as the liquid rises in tanks 11, more and more of plates 12 and 13 are positioned adjacent the liquid. As is known in the prior art and as will be discussed more fully hereinafter, the capacitance between plates 12 and 13 will linerally increase as the liquid level increases. This phenomenon may be utilized to provide an output indicative of the liquid level in any one of tanks 11.

Circuit means 10 includes an oscillator 14 which produces an AC voltage which is maintained at a constant value. The output of oscillator 14 is connected to a primary winding 15 of a transformer 16, one end of winding 15 being connected to the frame ground 19 of the vehicle on which circuit means 10 is mounted. Transformer 16 has a first secondary winding 17, the positive polarity end of which is connected to the arm 18 of a switch 20. Switch 20 has alternate output terminals 21 and 22, one of which is connected to plate 12 of one tank 11 whereas the other one of which is connected to plate 12 of the other tank 11. Thus, switch 20 permits the output of oscillator 14 to be connected to whichever tank 11 a user desires to know the liquid level in.

Transformer 16 has an additional secondary winding 23, the positive polarity end of which is connected to the negative polarity end of winding 17 and to the circuit ground 29 of circuit means 10. The negative polarity end of winding 23 is connected to first ends of a pair of variable capacitors 24 and 25, the other ends of which are connected to the terminals 26 and 27, respectively, of a switch 28. Terminals 26 and 27 are also connected via shielded cables 30 and 31, respectively, to the plates 13 of the different tanks 11. Obviously, by providing switches 20 and 28 with additional terminals, circuit means 10 can receive the outputs from additional tanks 11.

Winding 17 of transformer 16 has a center tap which is connected to ground 19. The shields 32 and 33 of cables 30 and 31, respectively, are connected to ground 29.

Switch 28 includes an arm 35 which is mechanically connected to arm 18 of switch 20 and electrically connected to the negative input terminal of an operational amplifier 36. The positive input terminal of amplifier 36 is connected to ground 29. Amplifier 36 has a positive output terminal and this output terminal is connected via the parallel combination of a capacitor 37 and a resistor 38 back to the negative input terminal.

The output signal of amplifier 36 is an AC signal indicative of the liquid level in the selected one of tanks 11. This signal is conducted via a capacitor 40 and a resistor 41, which operate to filter any DC signal, to the negative input terminal of an operational amplifier 42, the positive input terminal of which is connected to ground 29. The positive output of amplifier 42 is connected to first ends of variable feedback resistors 43 and 44, the other ends of which are connected to the terminals 45 and 46, respectively, of a switch 47. Switch 47 includes an arm 48 which is mechanically connected to arms 18 and 35 of switches 20 and 28, respectively, and electrically connected to the negative input terminal of operational amplifier 42. The output of operational amplifier 42 is also connected to the input of an AC to DC converter 39, the output of which is connected to a meter 49.

Figure 1B:
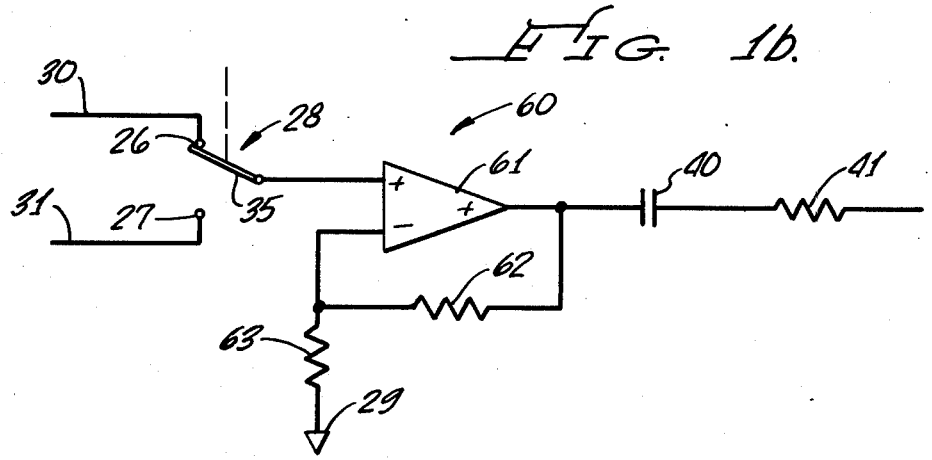
FIG. 1b is a partial block diagram of a second embodiment of the present apparatus for determining the liquid level in a non-metallic tank.

Referring now to FIG. 1b, there is partially shown circuit means, generally designated 60, for determining the liquid level in one or more of a plurality of tanks 11. Circuit means 60 is identical to circuit means 10 except as shown in FIG. 1b. That is, according to the embodiment of FIG. 1b, arm 35 of switch 28 is mechanically connected to arm 18 of switch 20 and electrically connected to the positive input terminal of a high input impedence amplifier 61. Amplifier 61 has a positive output terminal and this output terminal is connected via a resistor 62 back to the negative input terminal thereof, which negative input terminal is also connected via a resistor 63 to ground 29. The output terminal of amplifier 61 is also connected through capacitor 40 and resistor 41 to the input terminal of amplifier 42.

In operation, circuit means 10 and 60 operate on the principle that water and other liquids have a dielectric constant which is considerably greater than air. Water, to be specific, has a dielectric constant of about seventy times that of air. Oscillator 14 furnishes an AC signal which may be of any shape, although a square wave is preferred. This signal is applied by switch 20 to the metal plate 12 secured to one of tanks 11. If there is no liquid in the tank 11, the capacitance between plates 12 and 13 will be relatively low and the AC impedance will be high, limiting the current which flows between plates 12 and 13. As the liquid level rises, the capacity between plates 12 and 13 will increase because the dielectric constant of the space between plates 12 and 13 increases. This causes a decrease in the AC impedence between plates 12 and 13, allowing more current to flow therebetween.

This current is conducted via cable 30 or 31 and switch 28 to amplifier 36 or 61 which provide an output voltage whose amplitude is indicative of the current flowing between plates 12 and 13. This signal is conducted via capacitor 40 and resistor 41, which function to block any DC component in the signal, to operational amplifier 42 which functions to amplify the signal. The AC signal is converted to a DC signal by converter 39 before application to meter 49 which provides a continuous reading indicative of the liquid level in the selected tank 11. As will be described more fully hereinafter, capacitors 24 and 25 are utilized to adjust the zero position of meter 49 for the different tanks 11. Resistors 43 and 44 are utilized to adjust the full scale position of meter 49 for the different tanks 11.

As discussed previously, it is desirable to locate circuit means 10 or 60 at a central location, preferably where meter 49 is positioned. This permits circuit means 10 or 60 to be used for measuring the liquid level in more than one tank, such as the holding tank and the water tank of a recreational vehicle. This is also desirable so that the electronic components are in a more benign environment and to eliminate the cost of special containers to protect the electronics when mounted externally. However, when this is done, cables, such as cables 30 and 31, are required for connecting plates 13 to amplifiers 36 and 61. The problem is that the capacitance of cables 30 and 31 tends to be significantly more than the capacitance beween plates 12 and 13, making accurate measurements extremely difficult since the major portion of the current is dissipated by the cable capacitance. However, with the present invention, this problem has been eliminated.

The elimination of this problem by both of the embodiments disclosed herein may be better understood after an understanding of the following principle. That is, the voltage drop across a capacitor is given by the equation:

$$VC = \int I(t)dt, \quad (1)$$

where V = the voltage across the capacitor, C = the value of the capacitance, and I(t) = the current through the capacitor. If the same current is caused to flow through two capacitors, then:

$$V_1 C_1 = V_2 C_2 = \int I(t)dt \quad (2)$$

$$V_1/V_2 = C_2/C_1. \quad (3)$$

That is, the ratio of the voltages across the capacitors is inversely proportional to the ratio of the capacitors.

According to the first embodiment of the present invention, as shown in FIG. 1a, this principle is caused to occur by the use of an operational amplifier. One of the capacitors ($C_T$) is composed of the two plates 12 and 13 whereas the other capacitor ($C_f$) is capacitor 37. As will be discussed more fully hereinafter, the effect of the configuration shown in FIG. 1a is to cause the AC voltage on wire 30 or 31 to be very close to zero so that the negative input terminal of operational amplifier 36 can be considered to be a virtual ground. The current which flows through $C_T$ will, therefore, also flow through capacitor 37, there being very little flow through the capacitor 50, shown in FIG. 2a, which represents the capacitance of cable 30 or 31. This is because there is little voltage across capacitor 50, as will be described more fully hereinafter.

From equation (3), it can be seen that the output voltage ($e_o$) of amplifier 36 will be given by the expression $$e_o = e_i(C_T/C_f), \quad (4)$$

where $e_i$ = the output voltage of oscillator 14, since the voltage across $C_T$ will be just the oscillator voltage and the voltage across $C_f$ will be just the amplifier output voltage. The voltage $e_o$ will therefore increase or decrease as $C_T$ changes with liquid level and will be independent of operating frequency and voltage waveform and will be not affected by the capacitance of cables 30 and 31.

According to the embodiment of the present invention shown in FIG. 1b, advantage is taken of the fact that the capacitance of cables 30 and 31 can act as the second capacitor in equation (3), if all other current paths are prevented, as will be explained more fully hereinafter. More specifically, in the embodiment of FIG. 1b, amplifier 61 is connected so as to have a very high input impedance so that it does not draw any current. The output voltage oscillator 14 will therefore cause current to flow through the capacitance between plates 12 and 13 ($C_T$) and the capacitance of cable 30 or 31 ($C_L$), capacitance 50 in FIGS. 2a and 2b. This may be written as $$e_i = V_T + V_L, \quad (5)$$

where $V_T$ = the voltage across $C_T$ and $V_L$ = the voltage across $C_L$. Since $$V_T/V_L = C_L/C_T, \quad (6)$$

$$e_i = V_L(1 + \frac{C_L}{C_T}) \quad (7)$$

or $$\frac{V_L}{e_i} = \frac{1}{1 + \frac{C_L}{C_T}} = \frac{\frac{C_T}{C_L}}{1 + \frac{C_T}{C_L}}. \quad (8)$$

If $C_L >> C_T$, as will usually be the case:

$$V_L/e_i \simeq C_T/C_L. \quad (9)$$

The voltage at the output of amplifier 61 will just be $V_L$ times the amplifier gain (K) or:

$$e_o/e_i = KC_T/C_L. \quad (10)$$

This expression is substantially the same as in the embodiment of FIG. 1a and, as before, is independent of frequency and voltage waveform. Cable capacitance does not effect accuracy since in this case it is used as part of the circuit. However, if it becomes too large (i.e. the cable becomes too long), the output voltage will become too small to distinguish from noise.

With reference now to FIG. 2a, there is shown a simplified diagram of circuit means 10 which will aid in understanding this feature of the present invention. Oscillator 14 is connected to plate 12 and plate 13 is connected via cable 30 to operational amplifier 36. Capacitor 50, connected between cable 30 and ground 19, represents the capacitance of cable 30. Amplifier 36 has a gain K.

Oscillator 14 produces an AC voltage which is maintained at a constant value. This voltage causes a current $I_1$ to flow through plates 12 and 13. This current is divided at the junction between capacitors 50 and 37 such that a current $I_2$ flows through capacitor 50 and a current $I_3$ flows through capacitor 37. A voltage is therefore generated at the negative input terminal of amplifier 36, causing a voltage of opposite polarity to appear at its output terminal, which voltage is multiplied by the gain K of amplifier 36. Since the output voltage is opposite in polarity to the input voltage, the current through feedback capacitor 37 will be in the indicated direction. This current will be in a direction to reduce the voltage appearing at the input of amplifier 36, thereby reducing the current $I_2$ flowing through capacitor 50. As this voltage is reduced, the output voltage of amplifier 36 will also drop. A steady state condition is reached where there is just enough voltage at the input terminal of operational amplifier 36 to cause an output voltage sufficient to cause $I_3$ to be equal to $I_1$ plus a very small current caused by the input voltage across cable capacitor 50.

If the gain of amplifier 36 were infinitely large, an infintesimally small voltage would be required at the input terminal and the current $I_2$ through cable capacity 50 would approach zero. It is therefore apparent that the larger the gain of amplifier 36, the smaller the required input signal and the less current will flow through cable capacity 50 compared to the input current $I_1$ and, therefore, the smaller the measurement error caused by cable capacitor 50.

In practice, since loop gains of 100,000 or more are common for operational amplifier configurations, the result is to reduce the effect of cable capacitance 50 by approximately 1/K or 1/100,000. For measurement capacities between plates 12 and 13 of approximately 20 pf, this would mean that a cable capacity of 20/100 (100,000) = 20,000 pf would cause no more than 1% error. For cables with a capacitance of 40 pf/ft., the present invention would tolerate cable lengths of 500 feet with less than 1% error.

With reference now to FIG. 2b, there is shown a simplified diagram of circuit means 60 which will aid in understanding the present invention. Oscillator 14 is connected to plate 12 and plate 13 is connected via cable 30 to high impedance amplifier 61. Capacitor 50 connected between cable 30 and ground 19 represents the capacitance of cable 30. Amplifier 61 has a gain K.

Oscillator 14 produces an AC voltage which is maintained at a constant value. This voltage causes a current $I_1$ to flow through plates 12 and 13. This current divides and a portion flows into amplifier 61. This causes a voltage to appear between the input terminals of amplifier 61. This voltage is amplified by the loop gain K and appears at the output terminal of amplifier 61. The resistor network composed of resistors 62 and 63 causes a portion of this voltage to appear at the negative input terminal of amplifier 61. This voltage will act to decrease the voltage between the input terminals of amplifier 61. A steady state value will be reached such that there is just enough voltage at the output of amplifier 61 to cause the voltage at its negative input terminal to be equal to the voltage at its positive input terminal minus just enough to equal the output voltage divided by K. If K is very large, this voltage will be very small and, consequently the current $I_3$ flowing between the input terminals will be very small and $I_1$ will closely equal $I_2$. This substantiates the theory presented previously.

According to the present invention, the zero adjustment is independent of the full scale adjustment of meter 49 and both adjustments are frequency independent. The manner in which circuit means 10 and 60 achieve this can be best understood with reference to FIG. 3 which shows a simplified diagram of circuit means 10.

More specifically, oscillator 14 is constructed so as to have two outputs of opposite polarity, one derived from the positive terminal of secondary winding 17 and the other derived from the negative terminal of secondary winding 23. These outputs have amplitudes which are either equal or proportional to one another. This is easily achieved with a transformer, as shown in FIG. 1a.

When there is no liquid in tank 11, the capacitance between plates 12 and 13 will be at its lowest value, but will not be zero. Therefore, there will be some current flowing into the negative input terminal of amplifier 36 and, therefore, some output voltage. This is undesirable because it will cause an indication on meter 49. On the other hand, capacitors 24 and 25, capacitor 24 being shown in FIG. 3, receive an input voltage which is opposite in polarity to the voltage across plates 12 and 13 and these capacitors are also connected to the input of operational amplifier 36. Therefore, by adjusting capacitor 24 or 25, an equal but opposite current can be caused to flow into the input terminal of amplifier 36 and, therefore, the output voltage can be held to zero.

Resistors 43 and 44, which control the feedback across amplifier 42, can then be utilized to make the full scale adjustment for meter 49 when tanks 11 and 12 are full. Regardless of these adjustments, when the liquid level again returns to zero, the meter will again read zero. Circuit means 60 functions in an identical manner to cause the zero adjustment to be independent of the full scale adjustment of meter 49 and to cause both adjustments to be frequency independent.

An additional problem comes about when measuring the liquid level of a fluid where there is a conductive path from the liquid to the frame ground 19 of a vehicle on which circuit means 10 is installed. This path may be either resistive or capacitive. More specifically, and with reference to the simplified block diagram of FIG. 4, the liquid 51 in tank 11 may be considered as representing the center plate of a split capacitor. That is, the capacitance between plates 12 and 13 may be considered as including a pair of capacitors 52 and 53 representing the capacitance of the wall of tank 11 adjacent to plates 12 and 13, respectively, and a pair of capacitors 54 and 55 representing the capacitance of liquid 51. If the power for circuit means 10 were to be furnished directly by the vehicle battery (not shown), vehicle frame ground 19 and circuit ground 29 would be directly connected together. Under such circumstances, the junction between capacitors 54 and 55 may find a conductive path via a capacitor 56 and/or a resistor 57 to vehicle frame 19 and then via circuit ground 29 to the positive input terminal of amplifier 36.

As long as all of the current from plate 12 flows to plate 13, the current into amplifier 36 will represent the level of liquid 51 in tank 11. However, if a current path does exist from liquid 51 to the frame of the vehicle, under the circumstances just described, this current will represent an error since it by-passes the negative input terminal of amplifier 36 and flows to the positive input terminal thereof. This situation would be especially serious if the conductive path varies from time to time, as it would occur for water of different conductivities.

The general solution offered by the present invention is to interrupt the direct connection between vehicle frame ground 19 and circuit ground 29 through the use of transformer 16. However, even if grounds 19 and 29 are isolated, there will still exist a stray capacitance between frame ground 19 and shield 32 of cable 30, this capacitance being represented by capacitor 58 in FIG. 4. This stray capacitance can still cause an error if not accounted for, as done with the present invention.

More specifically, and still referring to FIG. 4, if current from plate 12 can be diverted through capacitors 52 and 54, the parallel combination of capacitor 56 and resistor 57, the frame, and capacitor 58 back to the ground terminal of amplifier 36, an error in reading will be caused since this current should have gone through capacitors 55 and 53 to the other input of amplifier 36. To prevent this from occurring, a connection is made from frame ground 19 to the center tap of winding 17. If plates 12 and 13 are made equal in area, liquid 51 will be at one-half the AC potential of winding 17 since the capacitance of capacitors 52 and 53 are equal. If the frame is also driven at one-half the potential of plate 12, which it is by the connection from the center tap of winding 17, there will be no potential difference between liquid 51 and the frame and no current can flow through capacitor 56 and resistor 57. Therefore, since the only other current path is through plate 13, the accuracy is preserved.

It should be noted that in general, the capacitance of capacitors 52 and 53 will be equal since the tank wall thickness will be approximately the same under plates 12 and 13. Furthermore, although capacitors 54–56 are really distributed capacitors and determining their relative values is a complicated field problem, experiments have indicated that liquid 51 is really at one-half the potential of driver plate 12, supporting the assumptions made above.

With circuit means 10 and 60, it can be shown mathematically and can be verified experimentally that the measurement signal is independent of frequency over a wide range of frequencies for frequencies above $\omega = 1/RC$, where, in circuit means 10, R is the resistance of resistor 38 and C is the capacitance of capacitor 37 and, in circuit means 60, R is the effective resistance of the input of amplifier 61 and C is the capacitance of capacitor 50. The upper frequency limit for circuit means 10 and 60 will be the zero db point of the open-loop gain of amplifiers 36 and 60, which is generally quite high.

The current between plates 12 and 13 will vary with the conductivity of the liquid in the tank. For water, this conductivity can vary from essentially zero to infinity. It can be shown mathematically and has been verified experimentally that the maximum magnitude of the error created by this variation will depend upon the ratio $C_1/C_2$, where $C_1$ is the capacitance of the wall of tank 11 and $C_2$ is the capacitance of the liquid in tank 11. Furthermore, this error is independent of frequency for the frequencies described above. It can be seen that since $C_1$ decreases with increasing tank wall thickness, the error will decrease with thicker tank walls. The limit will be when the signal level decreases to an unacceptable signal to noise ratio. As a practical matter, since $C_1$ can be made substantially greater than $C_2$, the error as liquid conductivity varies can be made quite small.

It can therefore be seen that according to the present invention, there is provided measurement means for determining the liquid level in tanks which solves the problems discussed hereinbefore. With circuit means 10 and 60, no element need be introduced inside of any tank 11, making circuit means 10 and 60 ideally suited for waste water tanks, such as used in recreational vehicles. With the present apparatus, circuit means 10 or 60 may be mounted at a central point so that it can be connected to more than one tank 11. Furthermore, this can be achieved because the present apparatus either effectively reduces to a negligible value the capacitance of cables 30 and 31 used to connect plates 12 and 13 to operational amplifier 36 or utilizes this capacitance as part of the circuit.

Circuit means 10 and 60 are relatively independent of variations in conductivity of liquid 51 in tank 11 and are relatively independent of operating frequency. Circuit means 10 and 60 are capable of operating over a wide range of frequencies and driving waveforms, making the circuit design of oscillator 14 uncritical and allowing operation at frequencies to avoid RFI problems. The present apparatus can operate on either internally or externally mounted sensors and tanks using either kind of sensor can be intermixed in a single measuring system.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. Apparatus for determining the liquid level in a tank comprising:
   a pair of parallel electrode plates secured to the outside surface of said tank with a generally vertical orientation so that as the liquid rises in said tank, an increasing area of said plates is adjacent said liquid whereby the capacitance between said plates increases as the liquid level in said tank increases;
   means for generating an AC voltage;
   means for coupling said AC voltage to one of said electrodes;
   amplification means having an input and an output;
   means for coupling the other of said electrodes to said input of said amplification means; and
   indicator means operatively coupled to said output of said amplification means for providing an indication of the liquid level in said tank.

2. Apparatus for determining the liquid level in a tank comprising:

a pair of electrodes secured to said tank in a manner such that the capacitance between said electrodes increases as the liquid level in said tank increases;

means for generating an AC voltage, said means comprising:
an oscillator; and
a transformer having a primary and a secondary winding, said primary winding being coupled to the output of said oscillator;

means for coupling one end of said secondary winding to one of said electrodes;

an amplifier having an input and an output;

a shielded cable connected between the other of said electrodes and said input of said amplifier;

means for connecting the other end of said secondary winding of said transformer to the shield of said cable;

a feedback element connected between said output of said amplifier and an input thereto, the output of said amplifier being substantially independent of the capacitance of said cable; and indicator means operatively coupled to the output of said amplifier for providing an indication of the liquid level in said tank.

3. Apparatus according to claim 2, wherein said tank is mounted on a vehicle which provides a ground and wherein said secondary winding of said transformer has a center tap connected to said vehicle ground.

4. Apparatus according to claim 3, wherein one end of said primary winding of said transformer is connected to said vehicle ground.

5. Apparatus for determining the liquid level in a tank comprising:
a pair of electrodes secured to said tank in a manner such that the capacitance between said electrodes increases as the liquid level in said tank increases;

means for generating an AC voltage;

means for coupling said AC voltage to one of said electrodes;

an amplifier having complimentary inputs, a high input impedance, and an output;

a cable connected between the other of said electrodes and the one input of said amplifier which has the same polarity as the output thereof;

a feedback element connected between said output of said amplifier and one of said inputs thereto, the output of said amplifier being substantially independent of the capacitance of said cable; and indicator means operatively coupled to the output of said amplifier for providing an indication for the liquid level in said tank.

6. Apparatus according to claim 5, wherein said feedback element is connected between said output of said amplifier and the other input thereto.

7. Apparatus according to claim 6, wherein said feedback element comprises a resistor.

* * * * *